(12) United States Patent
Steinkamp

(10) Patent No.: US 10,965,107 B2
(45) Date of Patent: Mar. 30, 2021

(54) WIRING HARNESS FOR TRUCKS

(71) Applicant: Hawkeye Truck Equipment Company, Des Moines, IA (US)

(72) Inventor: Tyler Steinkamp, Des Moines, IA (US)

(73) Assignee: Hawkeye Truck Equipment Co., Des Moines, IA (US)

( * ) Notice: Subject to any disclaimer, the term of this patent is extended or adjusted under 35 U.S.C. 154(b) by 143 days.

(21) Appl. No.: 15/872,489

(22) Filed: Jan. 16, 2018

(65) Prior Publication Data

US 2019/0222005 A1 Jul. 18, 2019

(51) Int. Cl.
| | |
|---|---|
| H02G 1/06 | (2006.01) |
| B60R 16/02 | (2006.01) |
| H01R 25/00 | (2006.01) |
| H01R 13/627 | (2006.01) |
| H01R 43/28 | (2006.01) |

(52) U.S. Cl.
CPC .......... *H02G 1/06* (2013.01); *B60R 16/0207* (2013.01); *H01R 13/6272* (2013.01); *H01R 25/003* (2013.01); *H01R 43/28* (2013.01)

(58) Field of Classification Search
CPC .... H02G 1/06; B60R 16/0207; H01R 25/003; H01R 13/6272; H01R 43/28
USPC ................... 29/828, 854, 857, 868
See application file for complete search history.

(56) References Cited

U.S. PATENT DOCUMENTS

| | | | | |
|---|---|---|---|---|
| 4,280,062 A | * | 7/1981 | Miller | B60Q 1/305 |
| | | | | 174/72 A |
| 4,455,096 A | * | 6/1984 | Brandstedt | B60Q 9/00 |
| | | | | 340/425.5 |
| 4,815,984 A | * | 3/1989 | Sugiyama | B60R 16/0239 |
| | | | | 174/72 A |
| 4,842,524 A | * | 6/1989 | Hopkins | H01R 25/003 |
| | | | | 439/35 |
| 4,942,499 A | * | 7/1990 | Shibata | B60R 16/0239 |
| | | | | 174/72 A |
| 5,856,908 A | * | 1/1999 | Takiguchi | B60R 16/0215 |
| | | | | 174/72 A |
| 5,963,013 A | * | 10/1999 | Watson | B60L 58/12 |
| | | | | 320/107 |
| 5,971,799 A | * | 10/1999 | Swade | B60R 16/0207 |
| | | | | 439/502 |

(Continued)

FOREIGN PATENT DOCUMENTS

| | | |
|---|---|---|
| CN | 104505651 A | 4/2015 |
| EP | 1339148 A1 | 8/2003 |
| WO | 9910206 A1 | 3/1999 |

*Primary Examiner* — Peter Dungba Vo
*Assistant Examiner* — Kaying Kue
(74) *Attorney, Agent, or Firm* — McKee, Voorhees & Sease, PLC

(57) ABSTRACT

A wiring harness system and installation method is provided for customizing a truck chassis to a provide quick and easy addition and repair of electrical features on a completed heavy-duty truck body. The system and method add the existing wires of the chassis, without the need for cutting or disconnecting anything on the chassis. A primary harness connects to the body builder plug and upfitter plug of the chassis and extends along the frame rails to the rear of the truck. One or more extension harnesses can be plugged into the connectors on the primary harness, with various electrical features of the truck body being plugged into the extension harnesses or the primary harness.

10 Claims, 8 Drawing Sheets

(56) References Cited

U.S. PATENT DOCUMENTS

| | | | | |
|---|---|---|---|---|
| 6,054,779 A * | 4/2000 | Zubko | B60Q 1/305 | |
| | | | 307/10.8 | |
| 6,265,829 B1 * | 7/2001 | Perdec | B60R 16/0207 | |
| | | | 315/82 | |
| 6,422,638 B1 * | 7/2002 | Carnaghi | B60J 1/1853 | |
| | | | 296/146.16 | |
| 6,504,306 B2 * | 1/2003 | Menze | B60Q 1/305 | |
| | | | 307/10.8 | |
| 6,844,496 B2 * | 1/2005 | Matsuda | B60R 16/0207 | |
| | | | 174/72 A | |
| 6,852,412 B2 * | 2/2005 | Keogh | B32B 1/00 | |
| | | | 174/113 R | |
| 7,137,724 B2 * | 11/2006 | Menze | B60Q 1/305 | |
| | | | 362/543 | |
| 7,189,925 B2 | 3/2007 | Kondoh et al. | | |
| 7,202,415 B2 | 4/2007 | Fujita | | |
| 7,241,146 B1 * | 7/2007 | Kim | B60R 16/0207 | |
| | | | 439/34 | |
| 7,400,058 B1 * | 7/2008 | Wayne | B60Q 1/143 | |
| | | | 307/9.1 | |
| 7,485,982 B2 | 2/2009 | Hayes | | |
| 8,487,182 B2 * | 7/2013 | Yamashita | B60R 16/0215 | |
| | | | 174/68.1 | |
| 9,278,645 B1 | 3/2016 | Orazem | | |
| 9,346,394 B1 | 5/2016 | Orazem | | |
| 9,663,045 B2 | 5/2017 | Satoh | | |
| 2002/0098357 A1 * | 7/2002 | Keogh | B32B 1/00 | |
| | | | 428/375 | |
| 2002/0171291 A1 * | 11/2002 | Wayne | B60Q 1/143 | |
| | | | 307/9.1 | |
| 2003/0039126 A1 * | 2/2003 | Fox | B60Q 1/302 | |
| | | | 362/485 | |
| 2004/0061446 A1 * | 4/2004 | Rhodes | B60R 16/0207 | |
| | | | 315/77 | |
| 2005/0106348 A1 * | 5/2005 | Koike | C08L 23/10 | |
| | | | 428/36.9 | |
| 2005/0275288 A1 * | 12/2005 | Miller | B60P 3/1033 | |
| | | | 307/10.1 | |
| 2007/0137884 A1 * | 6/2007 | Fuller | B60R 16/0222 | |
| | | | 174/153 G | |
| 2007/0243761 A1 * | 10/2007 | Chambers | C08K 5/20 | |
| | | | 439/587 | |
| 2008/0135119 A1 | 6/2008 | Tonooka et al. | | |
| 2008/0263805 A1 * | 10/2008 | Sebring | B60S 1/0497 | |
| | | | 15/250.01 | |
| 2009/0288727 A1 * | 11/2009 | Nordstrom | F16L 11/127 | |
| | | | 138/107 | |
| 2010/0201092 A1 * | 8/2010 | Pompa | B62D 61/12 | |
| | | | 280/86.5 | |
| 2011/0094796 A1 * | 4/2011 | Toyama | H02G 3/34 | |
| | | | 174/72 A | |
| 2011/0126566 A1 * | 6/2011 | Jones | B60H 1/00571 | |
| | | | 62/239 | |
| 2011/0134635 A1 * | 6/2011 | Feldman | B63C 9/26 | |
| | | | 362/234 | |
| 2012/0234934 A1 * | 9/2012 | Score | E01C 19/203 | |
| | | | 239/7 | |
| 2013/0062094 A1 * | 3/2013 | Naert | C08K 5/10 | |
| | | | 174/110 SR | |
| 2013/0092434 A1 * | 4/2013 | Kato | B60R 16/0215 | |
| | | | 174/72 A | |
| 2014/0102784 A1 * | 4/2014 | Silc | H01R 9/03 | |
| | | | 174/74 R | |
| 2014/0265837 A1 * | 9/2014 | Dobrow | B60R 16/0215 | |
| | | | 315/77 | |
| 2014/0311796 A1 * | 10/2014 | Gannon | H01B 7/2825 | |
| | | | 174/72 A | |
| 2015/0294768 A1 * | 10/2015 | Sakaki | H01B 13/004 | |
| | | | 174/68.3 | |
| 2016/0010354 A1 * | 1/2016 | Gaudet, III | B60P 7/0876 | |
| | | | 52/745.06 | |
| 2017/0066363 A1 | 3/2017 | Orazem | | |
| 2017/0116795 A1 * | 4/2017 | Andrus | G07C 5/0808 | |
| 2017/0229692 A1 * | 8/2017 | Thiel | H02S 30/20 | |
| 2018/0126932 A1 * | 5/2018 | Secord | B60R 16/03 | |

* cited by examiner

WIRING HARNESS FOR TRUCKS

FIELD OF THE INVENTION

The invention is directed to a wire harness kit and method for wiring truck and other vehicle frames so as to provide customized lighting and other electrical features for the vehicles.

BACKGROUND OF THE INVENTION

Heavy duty trucks are used for miscellaneous work by city, state and federal workers, as well as private businesses. These municipal and private trucks often are customized to add desired features for operation and safety, such as spotlights and strobe lights, as well as conventional brake lights, turn signals, parking lights, to light the work area and to make the trucks readily visible to other vehicles on the roads.

It is common for the municipality or private business to order a new truck from the manufacturer with only the frame, cab, engine and wheels, and minimal electrical wiring. That vehicle is then driven or transported to someone who will customize the vehicle for the particular intended use by adding wiring and a body with lights and other components. To legally drive these incomplete vehicles, the truck manufacturer must install a rear set of lights including stop, turn, and reverse or back up signals. These lights plug directly into an existing wire harness or connector installed at the truck factory.

In the conventional process for customizing a truck or chassis from municipal use, the existing connector for the manufacturer is unplugged and the manufacturer's lights and light harness are removed completely. Then, a junction box is installed near the rear of the chassis, and new wiring for the various lights and additional electrical components are installed. This new wiring process for customizing the vehicle can take 24-40 hours, since each accessory, such as spotlights and strobe lights, requested by the municipality or private owner requires a separate terminal within the junction box and its own separate wires, all of which must be soldered for proper electrical connection.

Similarly, customization of the manufacturer's chassis to add a dump body requires the original connector to be unplugged and the manufacturer's lights and light harness removed. Then, the original wiring harness is cut several inches behind the connector. Then, each wire must be tested to determine its function, which requires that each signal be manually turned on with a test light connected to the wires, one at a time. After testing, another set of wires is soldered so as to branch from the existing harness, and strung to the corner posts for the stop, turn, taillight, clearance lights and any other additional lighting on the dump body. This process for customizing a dump body on the chassis can take 1-2 hours.

Thus, the conventional customizing process for these vehicles is labor intensive. Also, the junction box used in municipal vehicles and the like is not weather tight, which leads to issues such as the moisture, freezing, electrical shorting, and wire corrosion. These issues can be minimized in the short term by heat shrink, which adds additional time and costs, and does not last indefinitely. Also, when problems arise, and repairs are needed, diagnosis is more difficult due to the amount of wires and connections in the junction box. The location of the junction box underneath the frame is also inconvenient. Furthermore, if additional accessories are needed after the initial customization, connecting more wires to the junction box is difficult. Similarly, replacing an accessory and/or existing wires is difficult and time consuming due to the junction box location and its compact, crowded structure.

While customizing a dump body is generally easier than a municipal body, similar difficulties exist when future repairs and replacements are needed. Cutting and replacing wiring also risks damage to the electrical components or features. Rather than cutting the wires, the entire harness can be replaced, though this also adds time and costs to the repairs.

Conventional wiring harnesses commonly use bullet style connections. However, the female bullet connector can expand and become less secure after the male bullet pin is retracted or removed for repairs or other steps in the customization or installation process. These types of connections are sensitive and can lead to safety issues while the vehicle is being driven, particularly as the vehicle ages.

More particularly, when a truck arrives for customization, it includes a cab, suspension with tires, frame rails, the engine, and the transmission. This is an incomplete vehicle which the municipality private company has ordered for conversion into the desired end vehicle. These trucks typically are class 6, 7, 9 or 8 category vehicles. The manufacturer's stripped down truck includes wiring only for their rear lights so that the truck dealer can legally drive the truck to the site for customization.

For a municipal vehicle, the customization process begins by measuring the length of wires needed to run from the body builder plug located below the cab at the rear of the cab to the rear of the truck frame rails. The installer normally cuts the wire length longer than needed so as to avoid splicing of a short wire length. The extra length adds additional costs, for example of $2.00-$3.00 per foot. Typically, a Carol Vutron style bundled wire is used, wherein up to 10 individual wires are grouped together and sealed in a casing.

Then, the casing seal of the Carol Vutron wire bundle is cut back to expose the individual wires, which are color coded for different functions. Selected individual wires from the bundle are stripped of installation and inserted into a crimp pin, which is then plugged into the body builder plug of the vehicle.

The upfitter switch of the incomplete truck must also be wired, though the conventional Carol Vutron loom normally is too big (i.e. 14-gauge wires) to fit into the upfitter switch plug. Therefore, the installer normally uses individual wires from wire spools (i.e. 16 gauge), and spirals the wire together before placing a split plastic loom over the looped wires to provide partial protection from the elements. The wires and plastic loom form an extension harness, with the ends of the wires extending beyond the loom for insertion into the upfitter switch plug inside the truck cab.

Next, the mechanic or installer solders the wires at the remote end of the extension harness to the wires in the Carol Vutron harness, then heat shrinks or otherwise provides a weather pact connector at the junction of bare wires.

Then, the mechanic can run the Carol Vutron wiring loom along the frame rails of the truck for connection to a junction box located at the rear of the rails. The casement or seal of the Carol Vutron loom is stripped a short distance so that the individual wires can be fed into the junction box. Normally, a heat shrink is applied to the wires adjacent the junction box port to minimize water and dirt migration into the junction box, though a complete seal from water and dirt is usually impossible, leading to corrosion of the terminals inside the junction box.

The next step is to connect the wires to the terminals inside the junction box and ground all the terminals with numerous jumper wires. Due the numerous wires in the junction box, it can be difficult to track which wire was intended for each function. Also, there is no standardization for the junction box wires because the Carol Vutron harness and other harnesses that are available do not have the same colors of wires that the truck manufacturer's use, so that different mechanics may wire the box differently with each light having different colored wires making future failures or problems difficult to diagnose. The wire ends must be soldered at the junction box terminals. Then, wires must be run from each electrical feature, such as strobe lights, left and right turn signals, parking, license plate, back up lights, spot lights, etc. into the junction box for connection for the terminals. For example, if a customer has one stop/turn/taillight, one strobe light, and two clearance lights in each rear corner post of a dump truck body, seven wires, including ground wires, must be run from each corner post into the junction box. Remote ends of these wires also must be soldered for connections to the lights, and heat shrunk for weather resistance.

Thus, the convention prior art junction box created numerous issues and required an enormous amount of time to properly wire all the internal terminals and route the wires to their respective lighting features. This prior art process also wasted substantial wiring, since the junction box was located at the rear of the truck rails, while some truck lights are at the opposite front end of the truck.

Therefore, a primary objective of the present invention is the provision of a method to simplify customized wiring to accommodate lights and electrical accessories on heavy duty trucks and vehicles such as to save time and costs.

Another objective of the present invention is the provision of a wire harness kit which utilizes a primary harness and secondary harness sections which can be quickly and easily installed for various needs and applications.

Still another objective of the present invention is the provision of a wire harness kit for use in customizing a manufacturer's truck chassis to add lights and other features, which allows for quick and easy repairs of select sections of the harness kit.

Another objective of the present invention is the provision of a method of wiring a truck chassis which utilizes a harness that plugs into the body builder plug or the upfitter plug of the truck chassis.

Yet another objective of the present invention is the provision wire harnesses for adding accessories to a truck chassis using male and female quick connectors.

A further objective of the present invention is a provision of a method of adding lights and electrical features for a truck chassis without cutting the original chassis wires, without use of a junction box, and without direct connection to the truck battery.

Still another objective of the present invention is the provision of a weather resistant wire harnessing kit for customizing heavy duty vehicles and equipment.

A further objective of the present invention is a wire harness system and method of installation on a vehicle chassis which is economical and durable over an extended life.

These and other objectives will become apparent from the following description of the invention.

SUMMARY OF THE INVENTION

The wire harness kit or system of the present invention is installed on a vehicle chassis so as to permit lights and other electrical accessories to be quickly and easily provided for the vehicle. The harness kit includes a primary wire harness adapted for connection to the body builder plug of the chassis, without cutting the original wires of the chassis, and extending the length of the vehicle frame. The primary harness includes a plurality of electrical branches each having a terminal end with a connector. One or more secondary wire harness sections can be selectively plugged into the branches of the primary harness and extended to desired locations on the chassis or truck body. Each secondary section has a terminal end with a plug for quick and easy attachment of lights and other accessories. The plugs are weather tight. A braided sleeve covers the wires of each harness for further weatherproofing and for ease of installation. The male and female quick connectors at the ends of each harness also simplifies connections during the installation process and for future repairs.

In the method of wiring a vehicle manufacture's chassis, the primary wire harness is plugged in to the body builder plug of the chassis and then strung along the chassis frame to the rear end of the frame. At least one secondary wire harness can then be plugged into the branches of the primary harness and strung through the desired location on the frame or on the truck/vehicle body. The electrical components, such as strobe lights, flood lights, and spot lights, can be plugged into the secondary harnesses. The method also involves an accessory wire harness which plugs into the upfitter plug of the truck chassis for use with additional electrical accessories of the vehicle. This wiring method of the vehicle chassis does not require cutting of the original chassis wires, the use of a junction box, soldering, heat shrinking, or other conventional steps, and thus saves significant time and expense for the installation process.

The wire harness of the present invention has all the individual wires covered by a braided fabric loom that is coated with PVC, with each wire terminating in a connector clip. This harness eliminates incorrect installation by a mechanic, and standardizes the wiring to simplify diagnosis of future problems. The wire harness kit substantially reduces the installation time and minimizes wasteful wiring running back and forth along the truck rails. The harnesses include connectors for extension harness to accommodate accessories anywhere along the length of the truck, this allowing quick connecting of the vehicle lights to the harness sections.

DETAILED DESCRIPTION OF THE PREFERRED EMBODIMENTS

Figure 1:
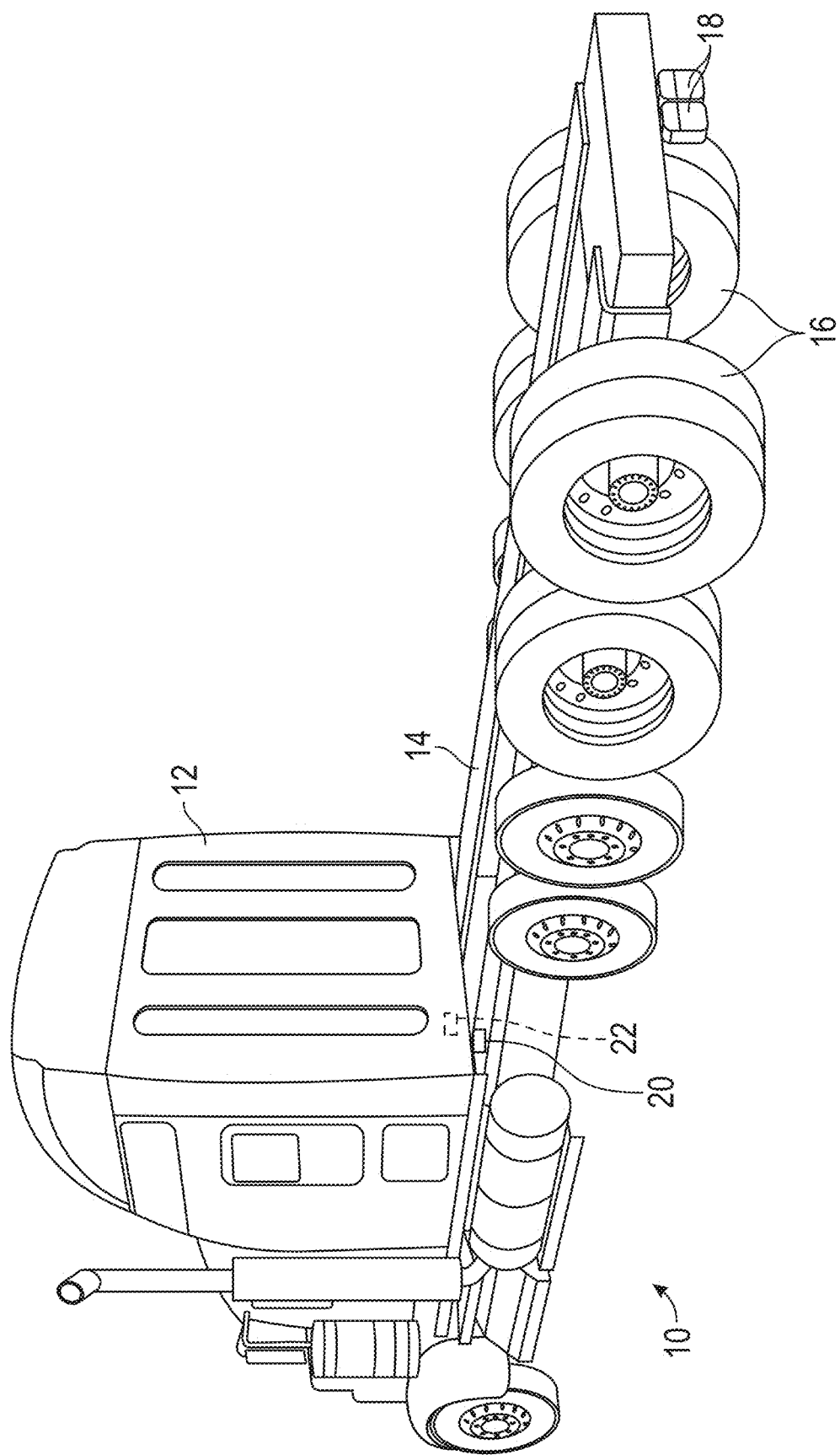
FIG. 1 shows an incomplete truck chassis as delivered from a manufacturer or dealer, ready for customization into a complete vehicle for a municipality or a company.

FIG. 1 shows a standard incomplete truck 10 from a manufacturer or dealer. The truck 10 includes a cab 12 mounted on a pair of parallel frame rails 14, with a suspension system and wheels 16 also mounted to the rails 14. The truck 10 includes an engine and transmission (not shown). The truck 10 has minimal wiring to the rear lights 18 and connected to the turn signals, brakes, and back up or reverse, so that the truck chassis 10 can be driven on roads. The electrical system of the truck 10 also includes a body builder plug 20 beneath the cab 12 at the rear of the cab, and an upfitter switch plug 22 inside the cab 12. The upfitter plug 22 is operatively connected to switches on the dashboard in the cab 12, which allows the truck driver to turn electrical features on and off, such as spot or strobe lights on the truck body.

The above structure of the truck 10 is conventional, and does not form a part of the present invention.

The present invention is directed towards a method and means for customized wiring of the truck 10 to individual needs of the truck owner, such as a governmental municipality or company. More particularly, a wiring kit is provided with a plurality of harnesses. Each harness includes a plurality of wires, typically 2-12 wires, encased within a flexible, braided fabric sleeve or loom 24, which provides easy handling of each harness and protection from the elements.

Figure 2A:
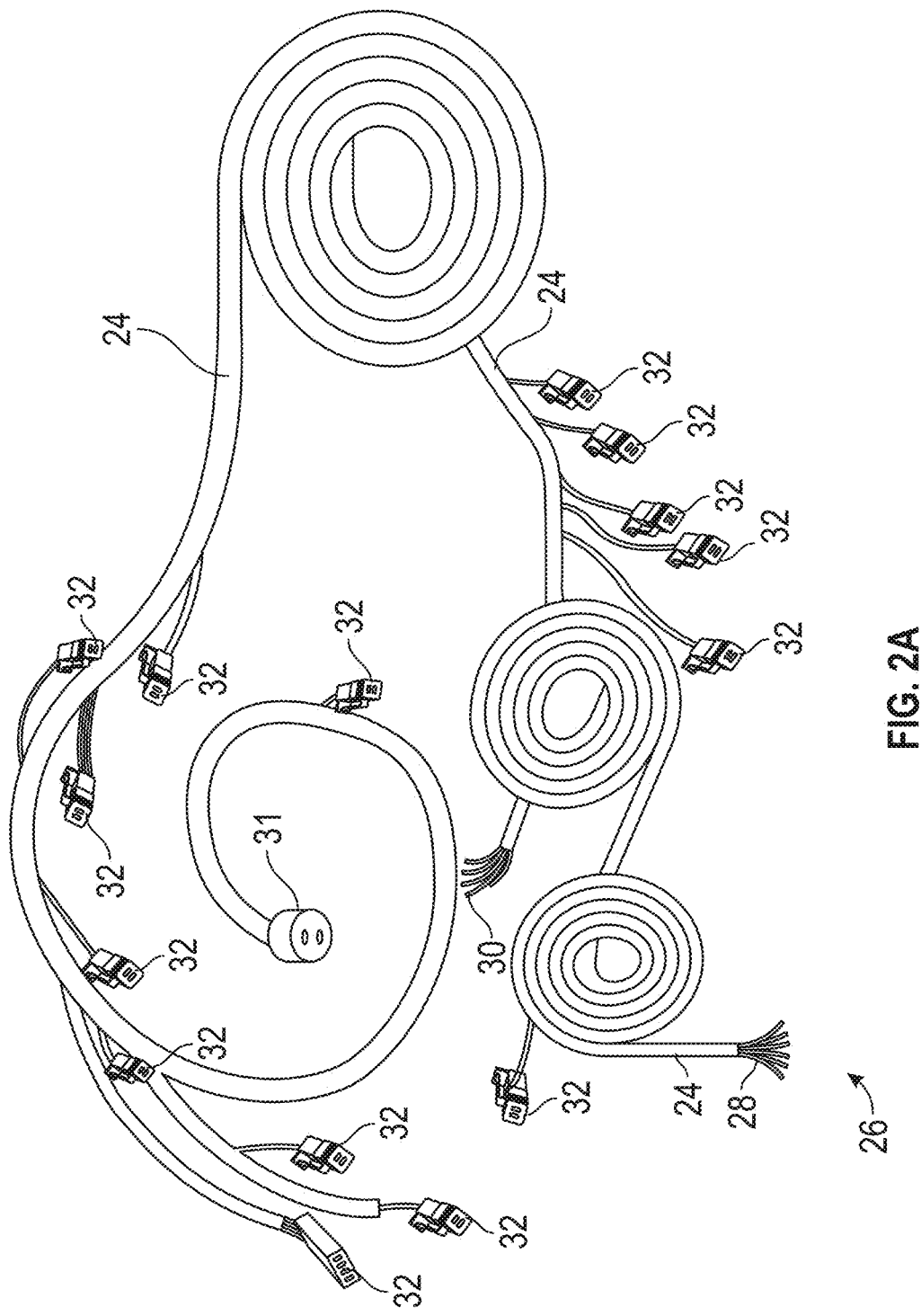
FIG. 2A is an illustration of the municipal wire harness according to the present invention.
Figure 2B:
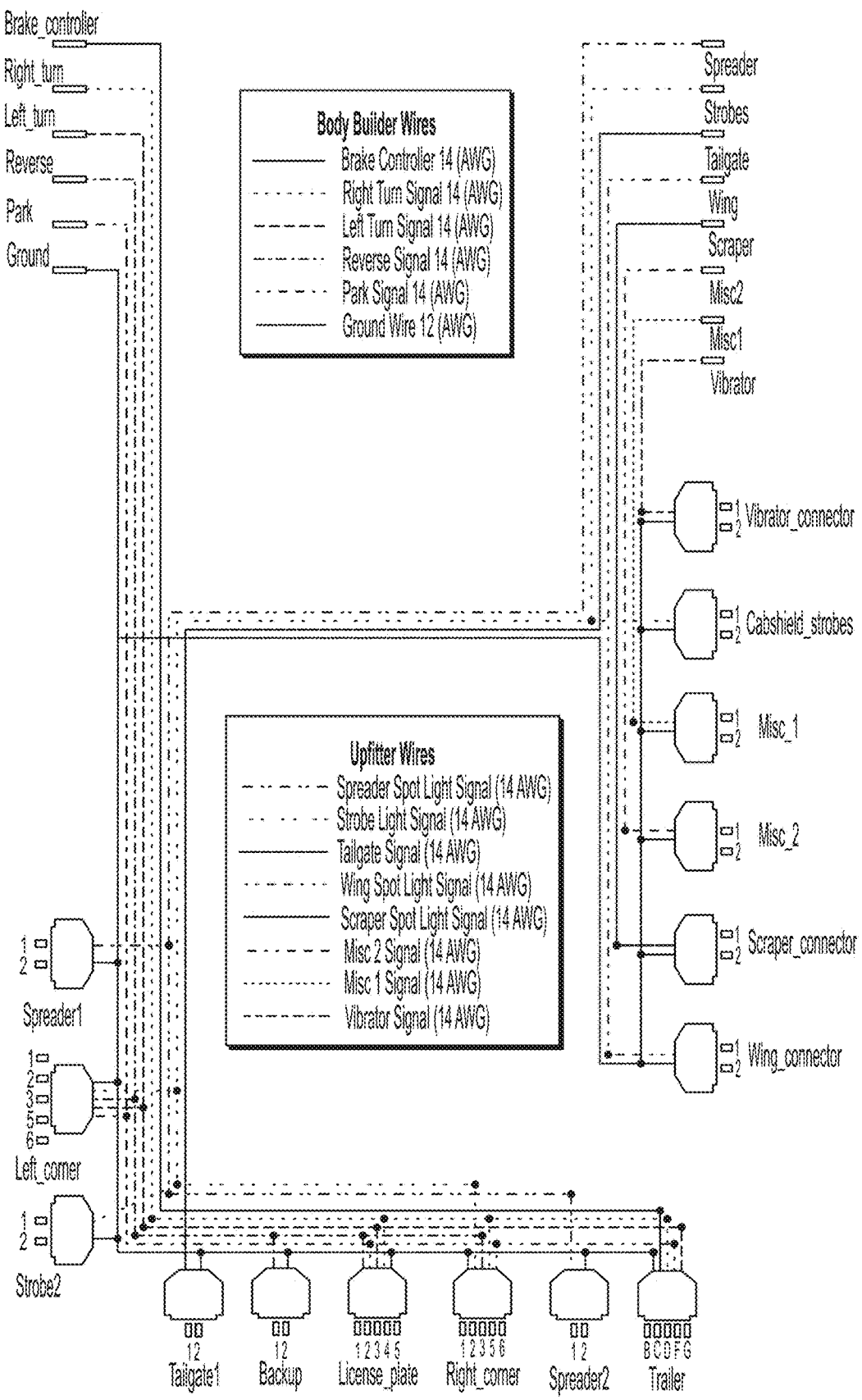
FIG. 2B is an electrical schematic of the municipal harness according to the present invention.

A primary harness 26 is shown in FIG. 2A and schematically represented in FIG. 2B. This municipal harness 26 includes a first set of wires 28 and a second set of wires 30. The wires 28 are adapted to be plugged into the body builder plug 20, and the second set of wires 30 are adapted to be plugged into the upfitter plug 22. After the wires 28, 30 are connected to the plugs 20, 22, the harness 26 is extended along and connected to one of the rails 14. The rear end of the harness 26 includes a hitch plug 31 to which an electrical plug on a trailer can be connected to operate the trailer lights and brakes.

The wires 28, 30 extend to different points along the harness 26, as shown in FIG. 2A. Clip connectors 32 on the ends of the wires allow quick connecting of mating connectors of the various electrical features of the truck, such as lights, vibrators, spreaders, and the like. One example of a commercially available clip connector is sold by Deutsch, such as the DTP and/or DT series connectors. As shown in FIG. 2B, the body builder wires 28 are adapted for connection to the brake controller, left and right turn signals, reverse signal, and parking signal for the truck 10, along with a ground wire. The quick connectors 32 for the body builder wires 28 are designated for the lights for the left and right corners of the truck, brake controller, the license plate, and a trailer pulled by the truck, and the backup lights. The connectors 32 for the upfitter wires 30 are adapted for connection to a salt or sand spreader spot light, a body vibrator, strobe lights, a scraper spot light, a wing plow spot light, and other miscellaneous features which the truck owner or operator may desire, such as audible noise makers used during backing up of the vehicle. It is noted that the connectors 32 may have different numbers of electrical contacts, depending upon the wire connections for the electrical features. A preferred example of the wiring colors, pins and functions for the harness of FIG. 2B is:

| Pin # | Wire Color | Function |
|---|---|---|
| | | Left Corner |
| 1 | WHITE | GROUND |
| 2 | RED | STROBE |
| 3 | BLUE | REVERSE |

-continued

| Pin # | Wire Color | Function |
|---|---|---|
| 5 | YELLOW | LEFT TURN |
| 6 | BROWN | PARK |
| | | License Plate |
| 1 | BLUE | REVERSE |
| 2 | BROWN | PARK |
| 3 | YELLOW | LEFT |
| 4 | GREEN | RIGHT |
| 5 | WHITE | GROUND |
| | | Right Corner |
| 1 | WHITE | GROUND |
| 2 | RED | STROBE |
| 3 | BLUE | REVERSE |
| 5 | GREEN | RIGHT TURN |
| 6 | BROWN | PARK |
| | | Trailer |
| B | White | Ground |
| C | Black | Brake Contr. |
| D | Green | Right |
| F | Brown | Park |
| G | Yellow | Left |
| | | Tailgate |
| 1 | Gray | Tailgate Wire |
| 2 | White | Ground |
| | | Spreader 2 |
| 1 | Purple | Spreader Wire |
| 2 | White | Ground |

Figure 3:
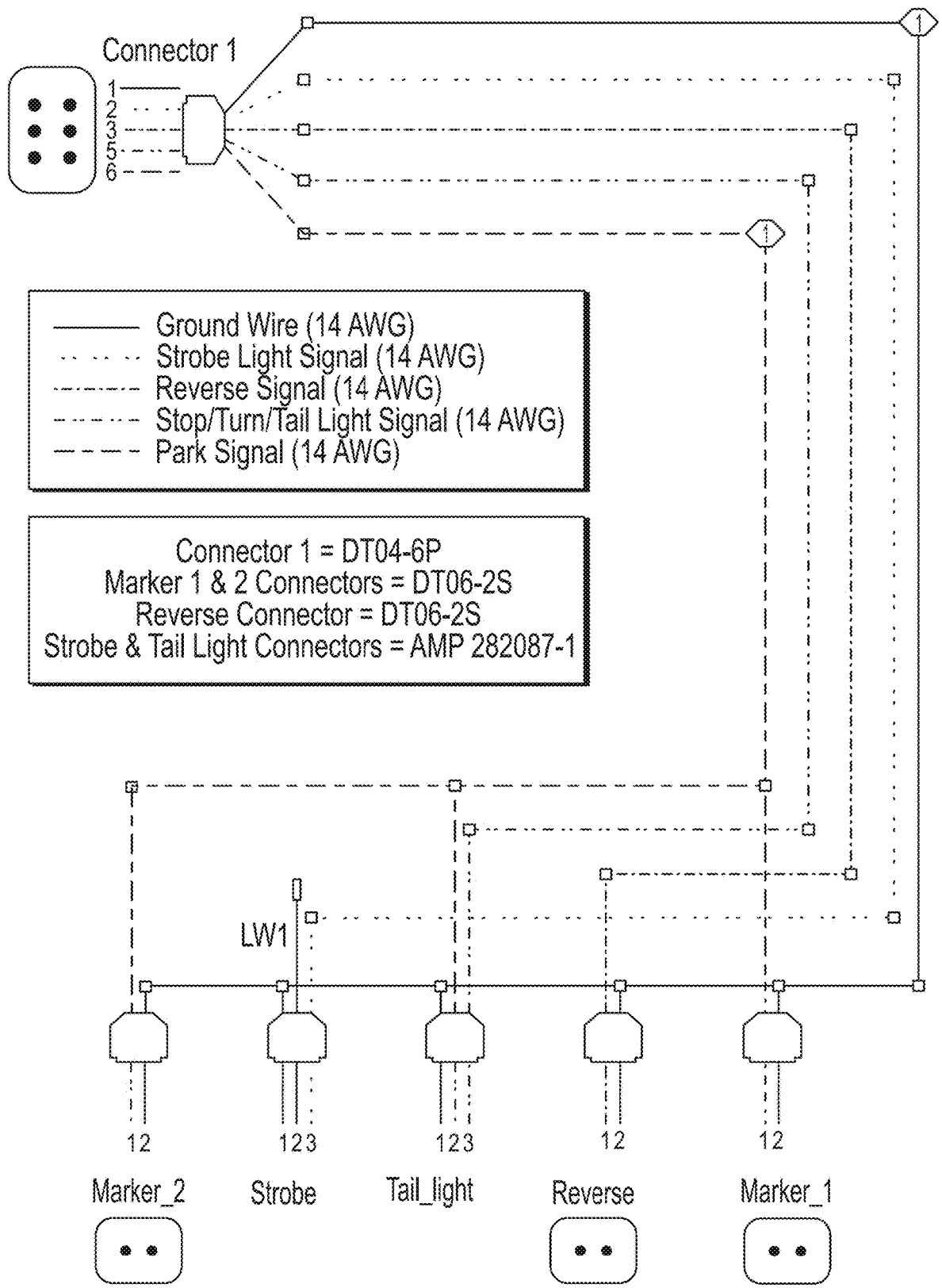
FIG. 3 is an electrical schematic of a corner post extension harness according to the present invention.

FIGS. 3-6 show various extension harnesses used in conjunction with the primary harness 26. FIGS. 3-6 show harness extensions adapted to plug into one of the connectors on the municipal harness that is connected to either the body builder wires 28 or upfitter wires 30. Each of the extension harnesses has a structure similar to the primary harness 26 with regard to multiple wires, clip connectors, and the braided loom. The extension harness 34 shown in FIG. 3 can be used for one of the truck body corner posts for connection to marker lights, strobe lights, taillights, and reverse lights. A preferred example of the wiring colors, pins and functions for the harness 34 of FIG. 3 is:

| Pin # | Wire color | Function |
|---|---|---|
| | | Connector 1 |
| 1 | WHITE | GROUND |
| 2 | RED | STROBE |
| 3 | BLUE | REVERSE |
| 4 | PURPLE | STOP/TAIL/TURN |
| 5 | BROWN | PARK |
| | | Tail light |
| 1 | WHITE | GROUND |
| 2 | BROWN | PARK |
| 3 | PURPLE | STOP/TAIL/TURN |
| | | Strobe |
| 1 | WHITE | GROUND |
| 2 | WHITE | GROUND (LOOSE WIRE) |
| 3 | RED | STROBE |

| Pin # | Wire color | Function |
|---|---|---|
| | Marker 1 | |
| 1 | BROWN | PARK |
| 2 | WHITE | GROUND |
| | Marker 2 | |
| 1 | BROWN | PARK |
| 2 | WHITE | GROUND |
| | Reverse | |
| 1 | BLUE | REVERSE |
| 2 | WHITE | GROUND |

Figure 4:
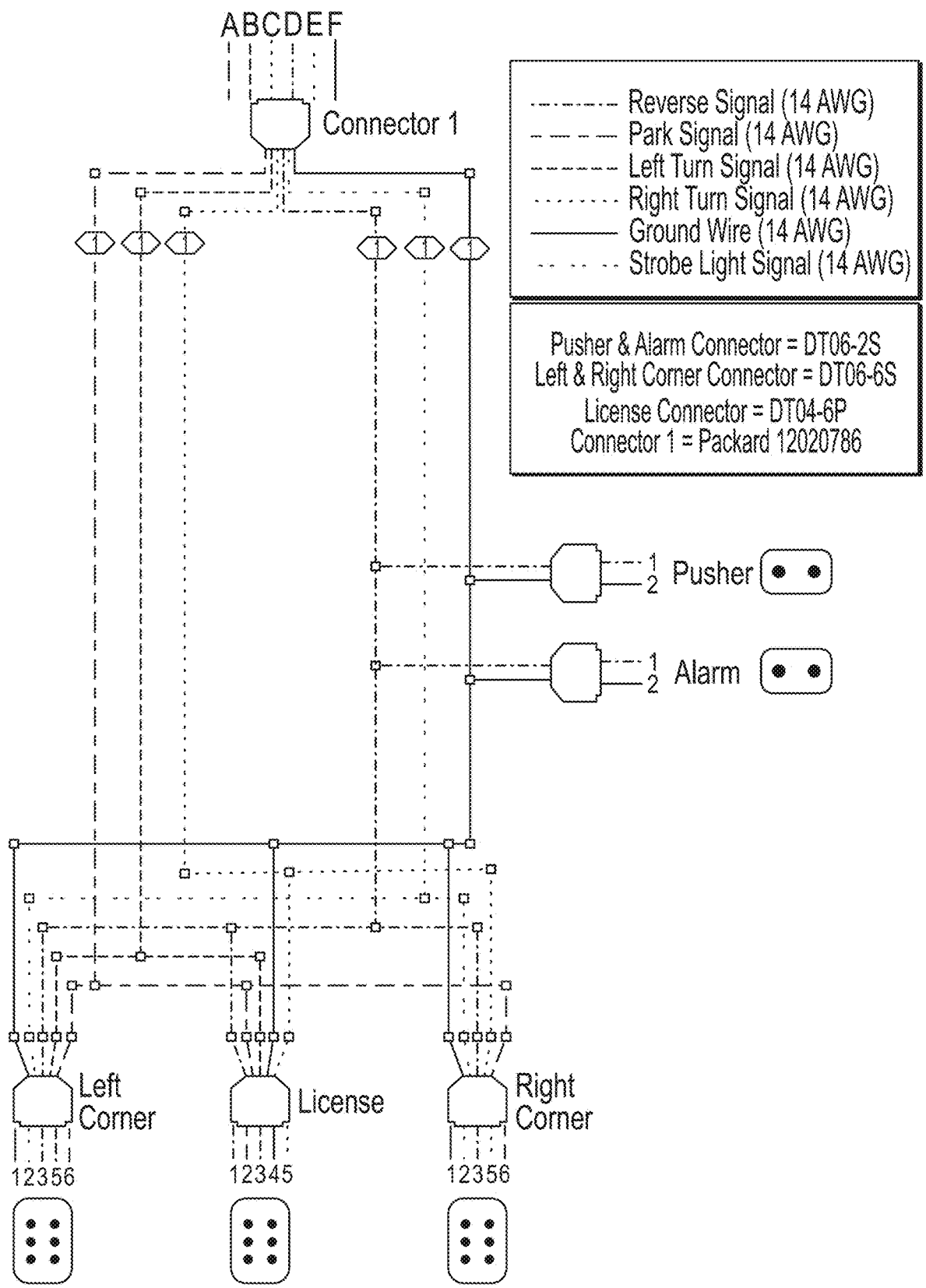
FIG. 4 is an electrical schematic of a pig tail harness section according to the present invention.

The extension harness 36 shown in FIG. 4 is a pig tail for connecting to an auxiliary suspension on the truck, and an alarm system on the truck, as well as the lights on the left and right corner posts and/or the license plate for the truck. A preferred example of the wiring colors, pins and functions for the harness 36 of FIG. 4 is:

| | Pusher | |
|---|---|---|
| 1 | Blue | Reverse |
| 2 | White | Ground |
| | Alarm | |
| 1 | Blue | Reverse |
| 2 | White | Ground |
| | License | |
| Pin # | Wire Color | Function |
| 1 | Blue | Reverse |
| 2 | Brown | Park |
| 3 | Yellow | Left |
| 4 | Green | Right |
| 5 | White | Ground |

Figure 5:
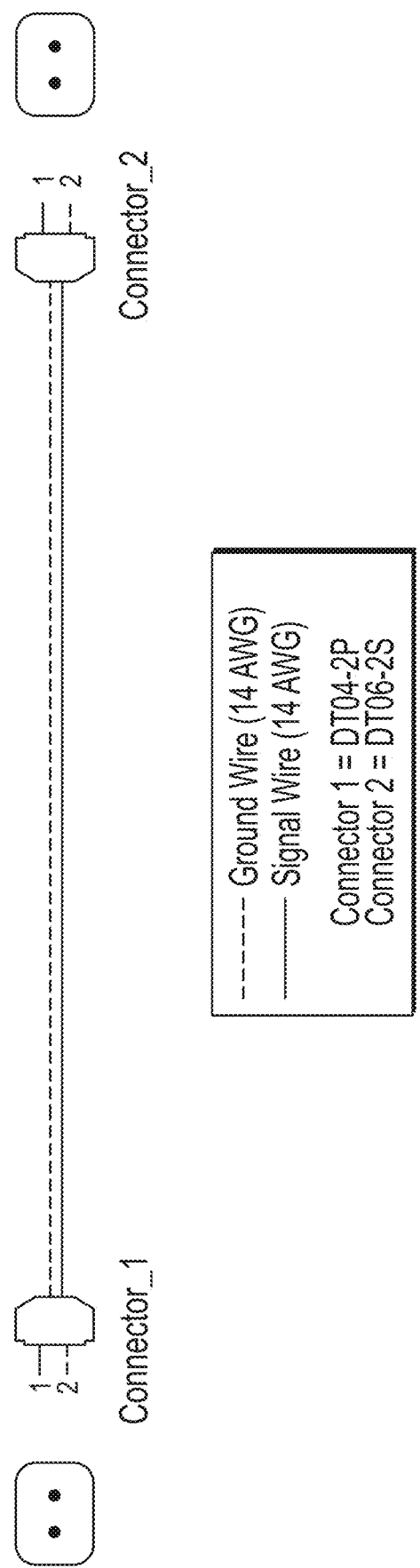
FIG. 5 is an electrical schematic of a spot light harness section according to the present invention.

The extension harness 38 shown in FIG. 5 is a simple connection for a spot light or other single electrical feature of the truck. A preferred example of the wiring colors, pins and functions for the harness 38 of FIG. 5 is:

| PIN # | WIRE COLOR | FUNCTION |
|---|---|---|
| | CONNECTOR 1 | |
| 1 | BLACK | SIGNAL |
| 2 | WHITE | GROUND |
| | CONNECTOR 2 | |
| 1 | BLACK | SIGNAL |
| 2 | WHITE | GROUND |

Figure 6:
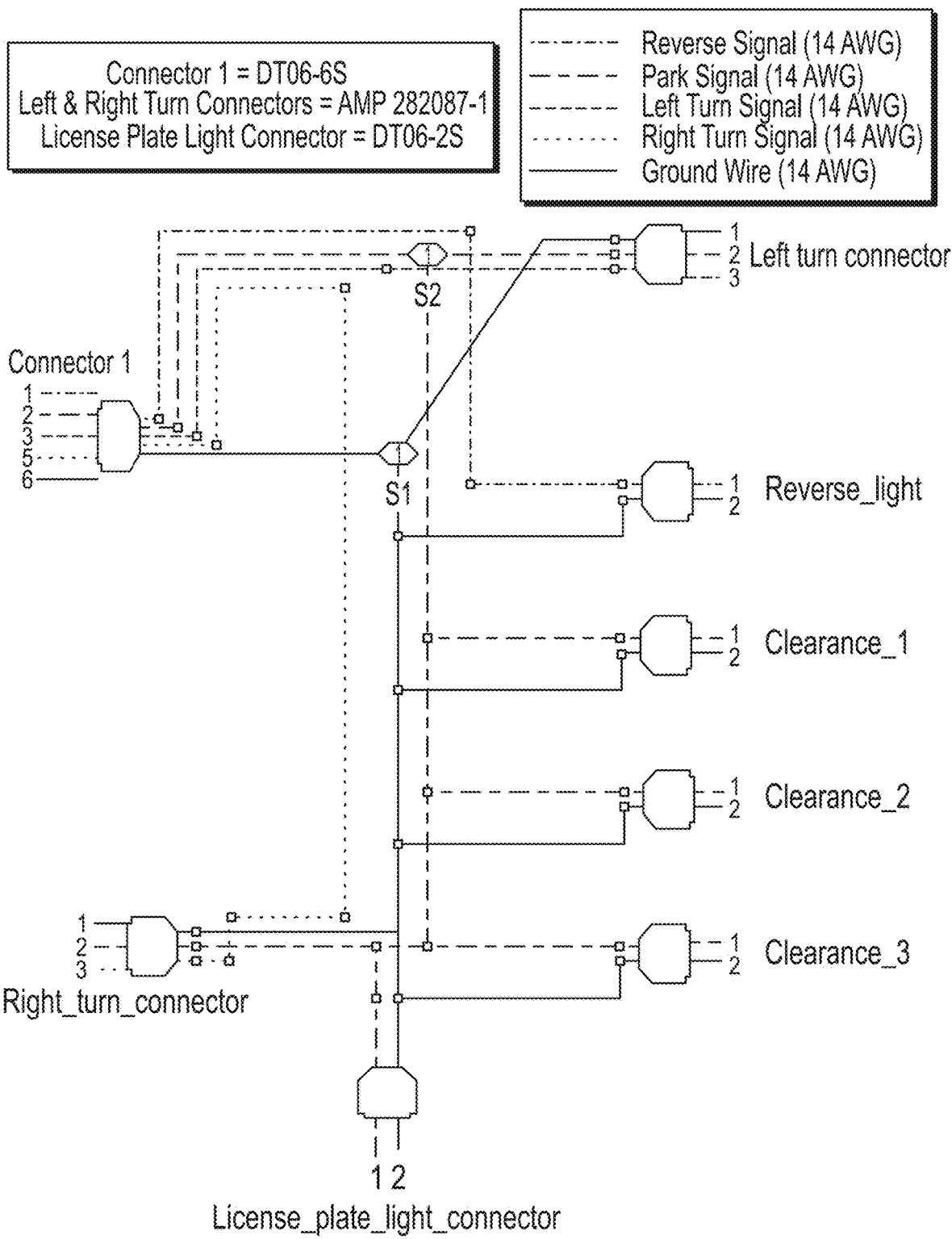
FIG. 6 is an electrical schematic of a license plate harness section according to the present invention.
Figure 7:
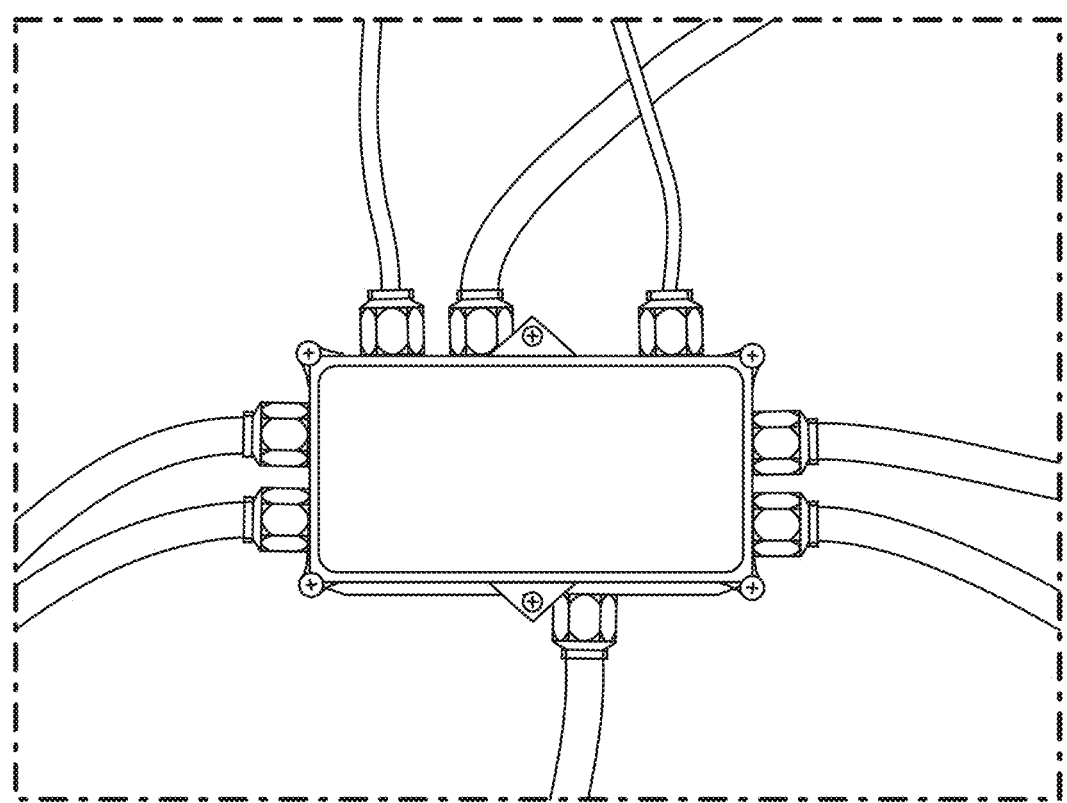
FIG. 7 shows a prior art wired junction box.

The extension harness 40 shown in FIG. 6 provides can be used for an additional set of taillights, reverse light, triple clearance lights and license plate light located between the truck rails at the rear of the chassis. A preferred example of the wiring colors, pins and functions for the harness 40 of FIG. 6 is:

| Pin # | Wire Color | Function |
|---|---|---|
| | Connector 1 | |
| 1 | Blue | Reverse |
| 2 | Brown | Park |
| 3 | Yellow | Left |
| 4 | Green | Right |
| 5 | White | Ground |
| | Left Turn | |
| 1 | White | Ground |
| 2 | Brown | Park |
| 3 | Yellow | Left |
| | Clearance 1 | |
| 1 | Brown | Park |
| 2 | White | Ground |
| | Clearance 2 | |
| 1 | Brown | Park |
| 2 | White | Ground |
| | Clearance 3 | |
| 1 | Brown | Park |
| 2 | White | Ground |
| | License Plate Connector | |
| 1 | Brown | Park |
| 2 | White | Ground |

It is understood that the connectors on the ends of the extension harnesses 34-40, a light can be connected to for clearance lights and other operational lighting needed.

Failures of lights or other electrical features on the truck are much easier to diagnosis with the harness kit or system of the present invention, since the wire routing and connections are greatly simplified via the connectors 32. Also, repairs are much easier because the sections define by the extension harnesses can be quickly and easily exchanged without trial and error.

With the harness system of the present invention, there is no need to cut the manufacturer's wiring in the truck. Rather, the primary harness 26 plugs directly into the truck's body builder plug 20 and the upfitter plug 22, without the need for direct connection to the truck battery. Also, the clip connectors 32 fasten securely and maintain connectivity even after multiple connecting and disconnecting procedures, as compared to prior art of bullet style connectors which tend to become lose over time and through repeated connections and disconnections. Also, the harness kit eliminates the prior art junction box, thereby providing a substantially faster and simpler customization for the electrical features of the completed truck. The heat shrinking, and soldering steps required in the prior art also eliminated by use of the clip connectors 32. The clip connectors 32 are also more weather resistant than the bullet style connectors, and allow the extension harnesses to be individually replaced, without having to replace the entire wiring system for the truck, as in the past.

The wiring harness system and method of wiring described for the truck 10 can be used on various heavy-duty trucks (i.e. Classes 6, 7, and 8 vehicles), such as dump body trucks, municipal body trucks, and grain body trucks, as well as on agricultural equipment, snow and ice equipment, mining equipment, trailers, demolition equipment, and other heavy commercial vehicles. The harnesses of the present invention have reduced installation time on municipal trucks from 24-40 hours down to 20-30 minutes, and on dump bodies from 1-2 hours to 5-10 minutes. The wire harness system and installation method improves the overall quality of the end product, having less issues with wiring connection, less down time for repairs, simpler diagnosis of electrical problems, and less liability for the installer. No relays are required with the harness system. Individual electrical features of the truck can be disconnected, without unplugging or disconnecting other electrical features. The harness system is not directly connected to the headlights of the vehicle and does not require a microprocessor, since the upfitter wires 32 connect to the dashboard switches via the truck's upfitter plug 22. Any connectors 32 not being used can be easily capped off.

Since the primary harness 26 is not directly connected to the vehicle battery, there is no loss of connection between the battery and the rest of the vehicle during installation of the primary harness 26 and extension harnesses 34-40. The loom, which is woven yarn coated in PVC, eliminates the need for heat shrinking, thereby reducing installation time, and maintains flexibility for easier routing of the harnesses 26, 34, 36, 38 and 40. Thus, the harness kit or system provides for universal application to various truck models, with time saving, easier installation and time saving, easier diagnosis and repairs. The installation method eliminates many steps and components from installations. The harnesses are more durable and weather resistant compared to the prior art. The harness system and methodology add to the existing truck wires, without any need to cut, unplug, or disconnect anything already provided on the truck 10.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A method of wiring a vehicle having a cab, a frame, a body builder plug outside a rear end of the cab, and an upfitter plug inside the cab, the method comprising:
    first, stringing a primary wire harness along the frame to a rear of the frame while the frame is uncovered, and the primary wire harness having a plurality of electrical branches between forward and rear ends at locations behind the cab and along the frame; then
    second, plugging a pair of forward ends of the primary wire harness directly into the body builder plug behind the cab and into the upfitter plug inside the cab; then
    third, plugging at least one secondary wire harness into one of the branches of the primary wire harness behind the cab; then
    fourth, plugging an electrical component of the vehicle into the secondary wire harness; and
    the method of wiring excluding any use of an electrical junction box.

2. The method of claim 1 wherein at least one of the plugging steps utilize male and female quick connectors.

3. The method of claim 1 wherein at least one of the plugging steps utilizes clip connectors.

4. The method of claim 1 wherein original equipment wires on the vehicle are not cut.

5. The method of claim 1 further comprises encasing the primary wire harness in braided fabric coated in PVC prior to the plugging steps.

6. The method of claim 1 further comprises stringing the secondary harness to a corner of the vehicle.

7. A method of adding electrical features to a straight truck, without a semi trailer, having a chassis with a frame and a cab mounted on the frame, comprising:
    attaching a primary wire harness to the frame of the chassis so as to extend substantially along the length of the frame behind the cab;
    electrically coupling a first forward end of the primary wire harness to a body builder plug on the truck,
    electrically coupling a second forward end of the primary wire harness to an upfitter plug inside the cab, without cutting pre-existing wires on the truck;
    electrically coupling a plurality of electrical features of the truck to a plurality of terminal ends of the primary wire harness at locations behind the cab via a plurality of plugs; and
    the electrical couplings of the primary wire harness to the body builder plug, to the upfitter plug, and to the electrical features of the truck all being without the use of a junction box.

8. The method of claim 7 further comprising electrically coupling a plurality of secondary wire harnesses to the primary wire harness, extending the secondary wire harnesses to selected locations on the truck, and electrically coupling additional electrical features to terminal ends of each secondary wire harness.

9. The method of claim 7 wherein at least one of the electrical couplings is via male and female clips.

10. The method of claim 7 wherein the electrical features are selected from a group comprising lighting, body vibrators, spot lights, strobe lights and audible sound generators.

* * * * *